(12) United States Patent
Remmelgas

(10) Patent No.: US 7,559,314 B2
(45) Date of Patent: Jul. 14, 2009

(54) METHOD FOR CONTROLLING A FUEL INJECTOR

(75) Inventor: Johan Remmelgas, Torslanda (SE)

(73) Assignee: Volvo Lastvagna AB, Gothenburg (SE)

( * ) Notice: Subject to any disclaimer, the term of this patent is extended or adjusted under 35 U.S.C. 154(b) by 163 days.

(21) Appl. No.: 11/813,774

(22) PCT Filed: Mar. 22, 2005

(86) PCT No.: PCT/SE2005/000424

§ 371 (c)(1),
(2), (4) Date: Jul. 12, 2007

(87) PCT Pub. No.: WO2006/101424

PCT Pub. Date: Sep. 28, 2006

(65) Prior Publication Data

US 2008/0149741 A1 Jun. 26, 2008

(51) Int. Cl.
F02M 37/04 (2006.01)
(52) U.S. Cl. ........................ 123/506; 123/496
(58) Field of Classification Search ................ 123/445, 123/446, 447, 467, 506, 496
See application file for complete search history.

(56) References Cited

U.S. PATENT DOCUMENTS

| 4,643,155 | A | * | 2/1987 | O'Neill | 123/506 |
| 5,622,152 | A | * | 4/1997 | Ishida | 123/446 |
| 5,711,279 | A | * | 1/1998 | Green et al. | 123/506 |
| 5,893,350 | A | * | 4/1999 | Timms | 123/647 |
| 6,113,014 | A | * | 9/2000 | Coldren et al. | 239/585.1 |
| 6,189,509 | B1 | * | 2/2001 | Froment | 123/467 |
| 6,273,066 | B1 | * | 8/2001 | Frankle et al. | 123/446 |
| 6,328,017 | B1 | * | 12/2001 | Heinz et al. | 123/467 |
| 6,336,444 | B1 | * | 1/2002 | Suder | 123/496 |
| 6,336,445 | B1 | * | 1/2002 | Yamazaki et al. | 123/506 |
| 6,394,073 | B1 | * | 5/2002 | Binkele et al. | 123/506 |
| 6,523,526 | B2 | * | 2/2003 | Schwarz | 123/506 |
| 6,595,189 | B2 | | 7/2003 | Coldren et al. | |
| 6,604,507 | B1 | * | 8/2003 | Lei et al. | 123/446 |
| 6,659,086 | B2 | * | 12/2003 | Rodriguez-Amaya et al. | 123/467 |
| 6,684,854 | B2 | * | 2/2004 | Coldren et al. | 123/446 |

(Continued)

FOREIGN PATENT DOCUMENTS

WO 2004007934 A1 1/2004

OTHER PUBLICATIONS

International Search Report for corresponding International Application PCT/SE2005/000424.

(Continued)

*Primary Examiner*—Thomas N Moulis
(74) *Attorney, Agent, or Firm*—WRB-IP LLP

(57) ABSTRACT

A method in an internal combustion engine for controlling a fuel injector of the unit injector type which includes a plunger that is driven by a rotating camshaft and during a working stroke generates a hydraulic pressure increase in the fuel. Pressure build-up is regulated by a spill valve the injection sequence is regulated by a needle control valve. The spill valve and the needle control valve are regulated in such a way that additional plunger retardation force is produced in a part of a working stroke in addition to the normal retardation force that is produced by the plunger return spring and the flow resistance in the injector.

14 Claims, 2 Drawing Sheets

U.S. PATENT DOCUMENTS

| | | | |
|---|---|---|---|
| 6,843,053 B2 * | 1/2005 | Draper et al. | 60/274 |
| 6,910,462 B2 * | 6/2005 | Sun et al. | 123/445 |
| 6,976,474 B1 * | 12/2005 | Coldren et al. | 123/446 |
| 7,047,941 B2 * | 5/2006 | Draper et al. | 123/447 |
| 7,059,301 B2 * | 6/2006 | Stockner et al. | 123/446 |
| 7,111,614 B1 * | 9/2006 | Coldren et al. | 123/467 |
| 7,121,476 B2 * | 10/2006 | Buehler et al. | 239/88 |
| 7,455,243 B2 * | 11/2008 | Coldren et al. | 239/5 |
| 2003/0111061 A1 * | 6/2003 | Coldren et al. | 123/514 |
| 2004/0103649 A1 | 6/2004 | Persson et al. | |
| 2005/0150972 A1 * | 7/2005 | Dong et al. | 239/5 |
| 2006/0266335 A1 * | 11/2006 | Barnes et al. | 123/467 |

OTHER PUBLICATIONS

International Preliminary Report on Patentability for corresponding International Application PCT/SE2005/000424.

* cited by examiner

METHOD FOR CONTROLLING A FUEL INJECTOR

BACKGROUND AND SUMMARY

The present invention relates to a method in a internal combustion engine for controlling a fuel injector of the unit injector type, which comprises a plunger which is driven by a rotating camshaft and during a working stroke generates a hydraulic pressure increase in the fuel, which is regulated with regard to the pressure build-up by a spill valve and with regard to the injection sequence by a needle control valve.

In an internal combustion engine, such as a diesel engine with unit injectors, the injector plunger requires a strong return spring, in order to retard the plunger over a part of its working stroke. If the force of the return spring is not sufficiently great, there is a risk that the contact in the force transmission chain between the plunger and the driving cam lobe will be broken, with the result that damage can occur, for example, in the immediate area of the injector cam lobe corresponding to the maximum lift position of the plunger when the parts driven by the cam lobe are braked and the inertial forces tend to reduce the contact force between the cam lobe and the cam follower. It is therefore desirable to increase the contact force.

It is important to be able to inject fuel into the engine cylinders over a sufficiently wide crankshaft angle interval, both in order to be able to inject a sufficient quantity of fuel, and also in order to obtain the maximum possible freedom to vary the injection timing (as a function of the engine speed and load, for example). Usually, the crankshaft angle interval over which it is possible or desirable to inject fuel is partially limited by the admissible cam retardation. The admissible cam retardation is in practice determined by the force supplied by the return spring of the injector plunger and the pressure acting in opposition to the plunger; the magnitude of the cam retardation cannot be equal to or greater than this retardation, since the contact between the cam follower and the cam lobe is then broken.

An accepted solution to the problem described above has hitherto been to use a stronger plunger return spring. A disadvantage with a stronger return spring is that such a spring takes up more space. In modern diesel engines the space around the injectors is severely restricted by bulky valve mechanisms. It is therefore advantageous if the dimensions of the return spring can be limited, so that it does not interfere with other functions in the space around the injectors.

It is desirable to provide a method which will permit a rapid retardation of the injector plunger, without the need for a high spring force on the part of the plunger return spring. According to an aspect of the present invention, a method in a internal combustion engine for controlling a unit injector type fuel injector, the fuel injector comprising a plunger which is driven by a rotating camshaft and during a working stroke generates a hydraulic pressure increase in the fuel, comprises regulating hydraulic pressure increase in the fuel with regard to pressure build-up with a spill valve, regulating an injection sequence with a needle control valve, regulating the spill valve and the needle control valve such that additional plunger retardation force is produced in a part of a working stroke in addition to a normal retardation force that is produced by a plunger return spring and flow resistance in the injector, and using a camshaft to extend a crankshaft angle interval for injection with a required plunger speed beyond the crankshaft angle interval used in a normal injector without additional plunger retardation force.

BRIEF DESCRIPTION OF THE DRAWINGS

The invention will be described in more detail below, with reference to exemplary embodiments shown in the drawings attached, in which.

DETAILED DESCRIPTION

Figure 1:
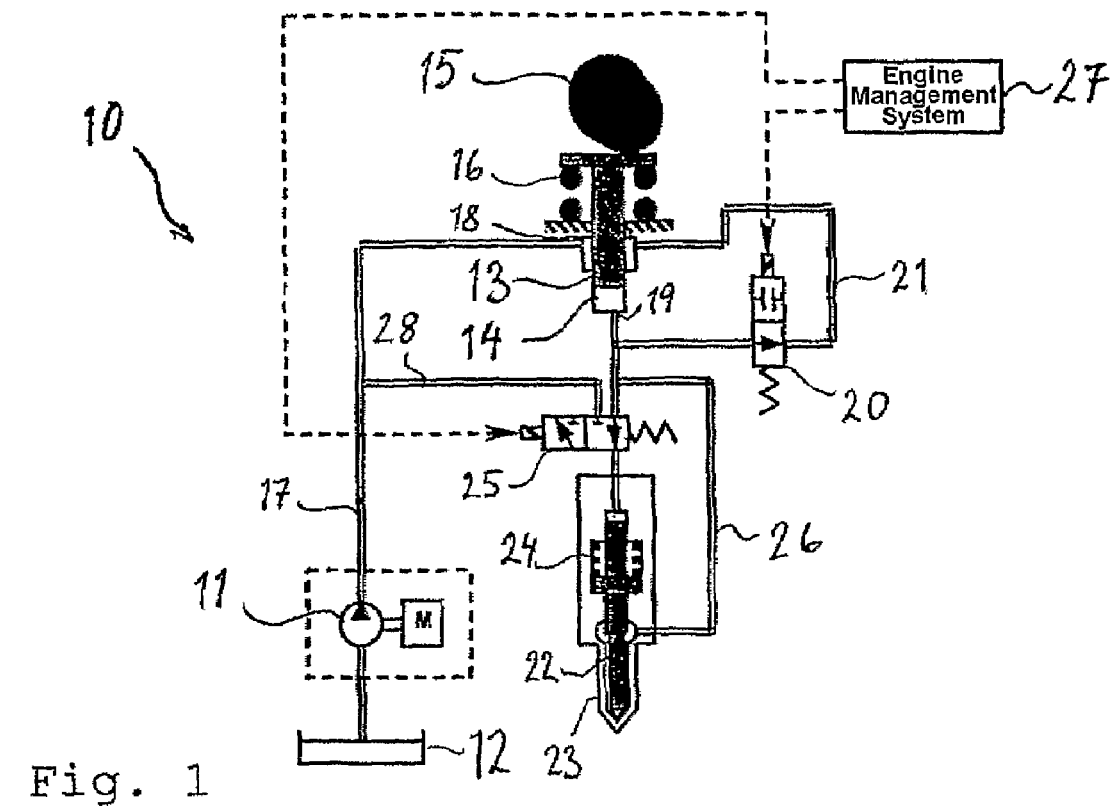
FIG. 1 shows a schematic representation of a fuel injector, which can be used to perform the method according to the invention, in a first operating position, FIG. 2 correspondingly shows the injector in a second operating position.
Figure 2:
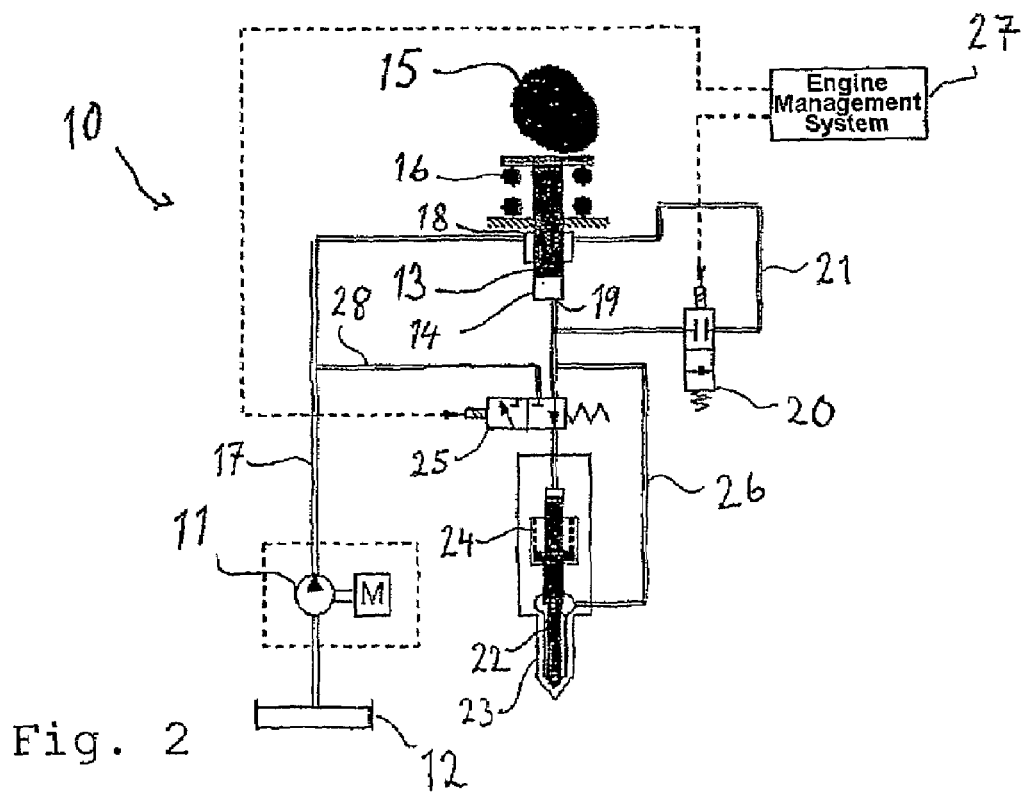

FIGS. 1 and 2 show schematic representations of a unit injector 10 of a type known in the art, which is fed with fuel by means of a pump 11, which draws it from a tank 12. The injector in a known manner comprises a plunger 13, which is driven to perform a reciprocating movement in a piston cylinder 14 by a camshaft 15 in opposition to the action of a compression spring 16 and any fuel pressure below the plunger. The contact between the camshaft lobe and the plunger can in reality be achieved directly by way of a cam-following roller, or in some other way, for example by way of a rocker arm.

The inlet end 18 of the piston cylinder 14 is connected to the pump feed line 17. The outlet end 19 of the piston cylinder 19 is connected to the inlet end 18 via an electrically controlled spill valve 20, which in its open position admits a flow via the circuit 21, that is to say the working of the plunger does not create any significant pressure build-up in the injector.

This pressure build-up occurs when the spill valve 20 is in the closed position (see FIG. 2) and is transmitted to the injector needle 22, which is supported so that it can move in the injector nozzle 23 in opposition to the action of a compression spring 24, partly via the needle control valve 25 to the rear end of the needle and partly via the branch line 26, which extends between the pointed end of the injector needle and a point upstream of the needle control valve 25. When the needle control valve 25 and the spill valve 20 assume the positions shown in FIG. 2, the hydraulic pressure is equal at both ends of the needle 22 and the injector nozzle is then kept closed by the action of the compression spring 24 irrespective of whether the pressure in the injector is high or low.

If the needle control valve 25, electrically controlled from the engine electronic control unit 27, is now made to assume its other position (not shown in the drawings), the pressure on the rear end of the needle will be returned to the inlet end 18 of the plunger 13 via a return line 28. In this way the hydraulic fuel pressure at the pointed end of the injector needle overcomes the force of the spring 24, the needle moves upwards in FIG. 2, and the injector is able, via the branch line 26, to inject fuel at high pressure into one of the engine cylinders.

When injection into the engine cylinders is not required, the needle control valve 25 therefore connects the rear end of the injector needle hydraulically to the outlet of the plunger. When the injector is to inject fuel at high pressure, the injection sequence commences with closure of the spill valve 20, in order to begin a build-up of pressure downstream of the plunger, the downward movement of which compresses the fuel and builds up the pressure. On reaching the required hydraulic pressure (depending on the load and engine speed, for example), the needle control valve is shifted to its other, pressure-relief position. The fuel then starts to be injected into the engine cylinder and the continuing downward movement of the plunger causes the fuel to be "expelled" out through the injector nozzle via the branch line 26. The pressure on the plunger during this movement is influenced, among other things, by the design shape of the cam lobe and by inherent characteristics of the injector.

When a sufficient quantity of fuel has been injected, the spill valve 20 is re-opened and the needle control valve 25 is shifted back to the first position shown in the drawings. This point marks a return to the original position in which the spill valve is open and the injector nozzle is closed.

According to the invention the spill valve 20 and the needle control valve 25 can be regulated by the engine control unit 27 in such a way that the fuel in the injector 10 causes the opposing force during the downward movement of the plunger to become greater than normal over a part of the working stroke of the plunger 13. This is done by regulating the needle control valve so that the injector nozzle is kept closed and regulating the hydraulic pressure between the plunger and the injector nozzle through opening and closing of the spill valve. The hydraulic pressure which acts against the end of the plunger can thus be utilized in order to retard the downward movement of the plunger over a part of the working stroke, which means that the force of the compression spring 16 does not need to be so great and that the plunger cam follower can still be made to follow the cam lobe without the risk of the contact between the cam lobe and the cam follower being interrupted.

If the engine is being used in engine braking mode, that is to say without injection occurring, it is possible to use a larger part of the cam lobe to build up retardation force than in ordinary engine operation, in which the cam lobe is mainly used for the injection work.

Figure 3:
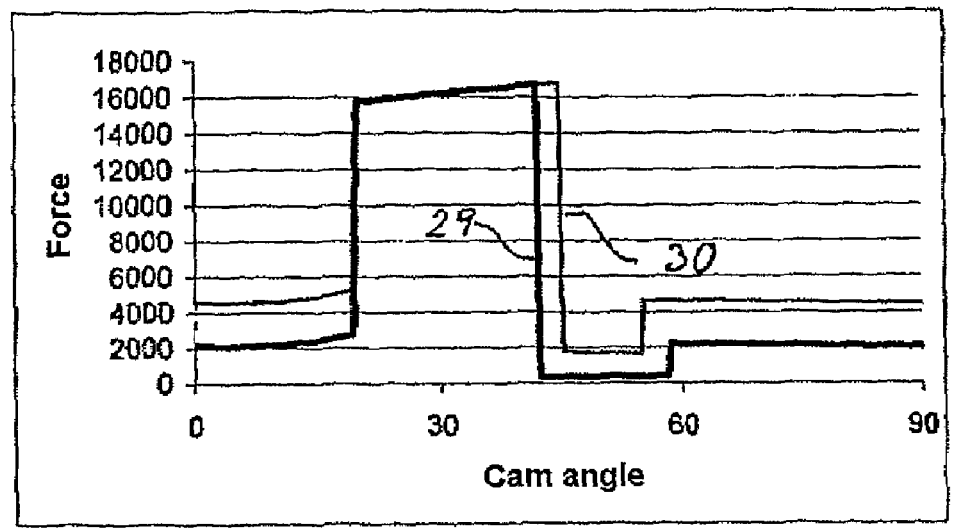
FIG. 3 shows a diagram comparing a known method and the method according to the invention with regard to the force/cam angle, and FIG. 4 correspondingly shows a comparison between a known method and the method according to the invention with regard to the plunger speed/cam angle correlation.
Figure 4:
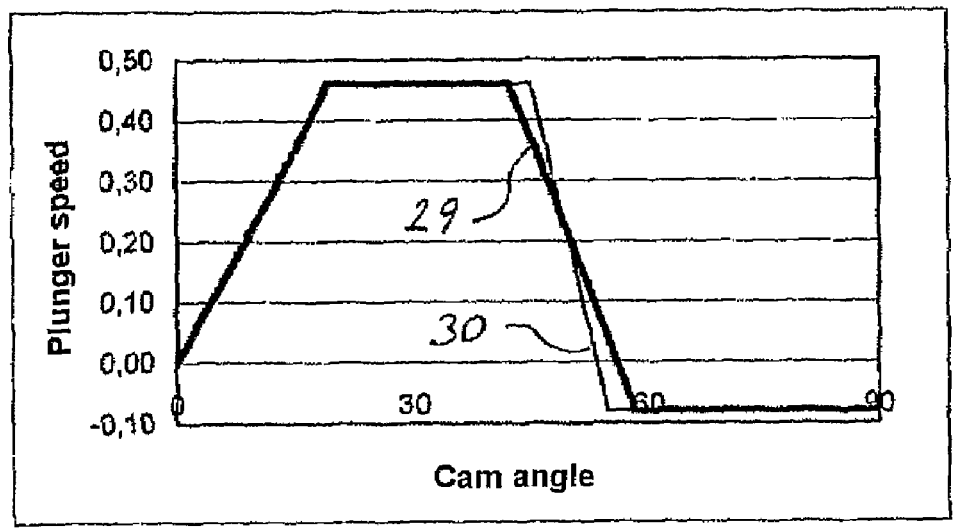

The contact force boosted by the hydraulic pressure can also be used to increase angular interval for injection, since retardation of the plunger can be effected more rapidly over a shorter angular interval. FIGS. 3 and 4 illustrate in diagrammatic form how a shortened angular interval for retardation of the plunger is used to prolong the injection angular interval, the bold lines 29 showing curves according to the prior art and the thinner lines 30 showing curves that are obtained by the method according to the invention.

The invention makes it possible to obtain certain of the advantages described above without modifying the hardware used. The other advantages can be achieved through simple modifications of the hardware. The invention also makes it possible to apply the increased retardation force solely at the engine speed and under the load conditions when this is required. This is obviously not possible by applying a stronger return spring 16. For example, one can elect to use the increase that is produced by the compressed fuel in order to reduce the risk of damage to the cam follower or the cam lobe at all engine speeds, or merely as a safety measure at very high engine speeds.

Finally the invention makes it possible to apply the increased hydraulic force solely over a part of the working stroke of the plunger, this characteristic being desirable since it minimizes the risk of oil films on roller-rocker arm or rocker arm-rocker arm bearing contact surfaces becoming too thin due to the high loads over the entire working stroke of the plunger, as in the case of a stronger plunger return spring 16.

The invention must not be regarded as being limited to the exemplary embodiments described above, a number of further variants and modifications being feasible without departing from the scope of the following patent claims. For example, the spill valve 20 can be regulated according to a predetermined method which varies as a function of the engine speed or load, or through feedback to the engine control unit by means of a pressure sensor under the plunger. The mechanical return spring 16 may furthermore be replaced by a hydraulic system pressure in the injector.

The invention claimed is:

1. A method in a internal combustion engine for controlling a unit injector type fuel injector, the fuel injector comprising a plunger which is driven by a rotating camshaft and which during a working stroke generates a hydraulic pressure increase in the fuel, the method comprising:
   regulating hydraulic pressure increase in the fuel with regard to pressure build-up with a spill valve;
   regulating an injection sequence with a needle control valve;
   regulating the spill valve and the needle control valve such that additional plunger retardation force is produced in a part of a working stroke in addition to a normal retardation force that is produced by a plunger return spring and flow resistance in the injector; and
   using a camshaft to extend a crankshaft angle interval for injection with a required plunger speed beyond the crankshaft angle interval used in a normal injector without additional plunger retardation force.

2. The method as claimed in claim 1, comprising producing the additional retardation force through regulation of the spill valve in order to modulate the pressure build-up between the plunger and an injector nozzle.

3. The method as claimed in claim 1, comprising regulating the spill valve and the needle control valve with regard to engine speed.

4. The method as claimed in claim 3, comprising regulating the spill valve and the needle control valve with regard to engine load.

5. The method as claimed in claim 1, comprising regulating the spill valve and the needle control valve through feedback to an engine control unit by a pressure sensor downstream of the plunger.

6. The method as claimed in claim 1, comprising, when driving in engine braking mode, regulating the spill valve and the needle control valve such that the additional plunger retardation force is produced at an earlier crankshaft angle than in normal engine operation, in a part of a working stroke.

7. A use of a method as claimed in claim 1 together with a plunger return spring of lower spring force compared to the spring force used in a normal injector without additional plunger retardation force.

8. The method as claimed in claim 2, comprising regulating the spill valve and the needle control valve with regard to engine speed.

9. The method as claimed in claim 3, comprising regulating the spill valve and the needle control valve with regard to engine load.

10. The method as claimed in claim 2, comprising regulating the spill valve and the needle control valve through feedback to an engine control unit by a pressure sensor downstream of the plunger.

11. The method as claimed in claim 2, comprising, when driving in engine braking mode, regulating the spill valve and the needle control valve such that the additional plunger retardation force is produced at an earlier crankshaft angle than in normal engine operation, in a part of a working stroke.

12. The method as claimed in claim 3, comprising, when driving in engine braking mode, regulating the spill valve and the needle control valve such that the additional plunger retardation force is produced at an earlier crankshaft angle than in normal engine operation, in a part of a working stroke.

13. The method as claimed in claim 4, comprising, when driving in engine braking mode, regulating the spill valve and the needle control valve such that the additional plunger retardation force is produced at an earlier crankshaft angle than in normal engine operation, in a part of a working stroke.

14. The method as claimed in claim 5, comprising, when driving in engine braking mode, regulating the spill valve and the needle control valve such that the additional plunger retardation force is produced at an earlier crankshaft angle than in normal engine operation, in a part of a working stroke.

* * * * *

UNITED STATES PATENT AND TRADEMARK OFFICE
CERTIFICATE OF CORRECTION

PATENT NO. : 7,559,314 B2
APPLICATION NO. : 11/813774
DATED : July 14, 2009
INVENTOR(S) : Johan Remmelgas Page 1 of 1

It is certified that error appears in the above-identified patent and that said Letters Patent is hereby corrected as shown below:

Change assignee name from "Volvo Lastvagna AB" to --Volvo Lastvagnar AB--.

Signed and Sealed this

Eighteenth Day of August, 2009

David J. Kappos
*Director of the United States Patent and Trademark Office*